United States Patent [19]

Weigt

[11] 4,165,674

[45] Aug. 28, 1979

[54] CONTACT FREE DEVICE FOR LIMITING THE RELATIVE MOVEMENT OF HYDRAULICALLY ACTUATED MEMBERS

[75] Inventor: Armin Weigt, Schwerte-Wandhofen, Fed. Rep. of Germany

[73] Assignee: O & K Orenstein & Koppel Aktiengesellschaft, Berlin, Fed. Rep. of Germany

[21] Appl. No.: 750,243

[22] Filed: Dec. 13, 1976

[30] Foreign Application Priority Data

Dec. 11, 1975 [DE] Fed. Rep. of Germany ....... 2555642

[51] Int. Cl.² .................... F15B 11/16; F15B 13/06; F15B 15/22

[52] U.S. Cl. .................................... 91/178; 91/400; 91/511; 91/521

[58] Field of Search ................ 91/400, 178, 511, 521, 91/186

[56] References Cited

U.S. PATENT DOCUMENTS 3,941,033  3/1976  Olsen .................................... 91/400

*Primary Examiner*—Paul E. Maslousky
*Attorney, Agent, or Firm*—Becker & Becker, Inc.

[57] ABSTRACT

A contact free device for limiting the relative movement of hydraulically actuated members in which the device includes a proximity switch actuated at each limit position of the members and which interrupts the supply of hydraulic actuating fluid to the members. The supply of fluid to the members is resumed when movement of the members relatively away from the respective limit position is initiated.

3 Claims, 5 Drawing Figures

CONTACT FREE DEVICE FOR LIMITING THE RELATIVE MOVEMENT OF HYDRAULICALLY ACTUATED MEMBERS

The present invention relates to a device for a contact-free limitation of the movement of hydraulically operated mechanical parts, and more specifically, concerns a steering device for bucket loaders while one approximation initiator each is arranged at the front carriage. The arrangement is such that when the front carriage approaches the rear carriage, a magnetic valve attracts which through the intervention of hydraulic control conduits communicates with the tank.

With a heretofore known arrangement for a contact-free limitation of the movement of hydraulically actuated parts, approximation initiators will influence pertaining thyristors during the turning of the steering wheel and when the steered part approaches the non-steered part of the vehicle. This arrangement is rather expensive and requires special knowledge on the part of the operator of the construction an operation of the device.

It is, therefore, an object of the present invention to provide a simpler design in which customary reasonably priced structural elements are employed.

These objects and other objects and advantages of the invention will appear more clearly from the following specification in connection with the accompanying drawings, in which.

Figure 1:
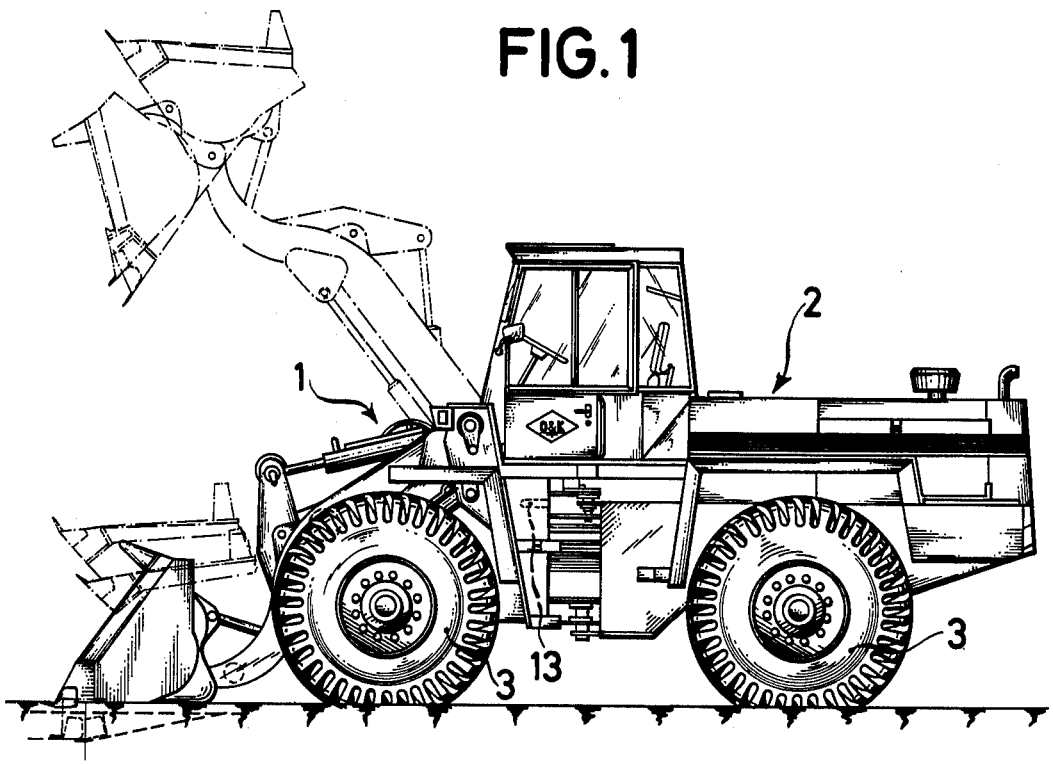
FIG. 1 is a side view of a wheel loader with hinge steering or articulated steering gear.
Figure 2:
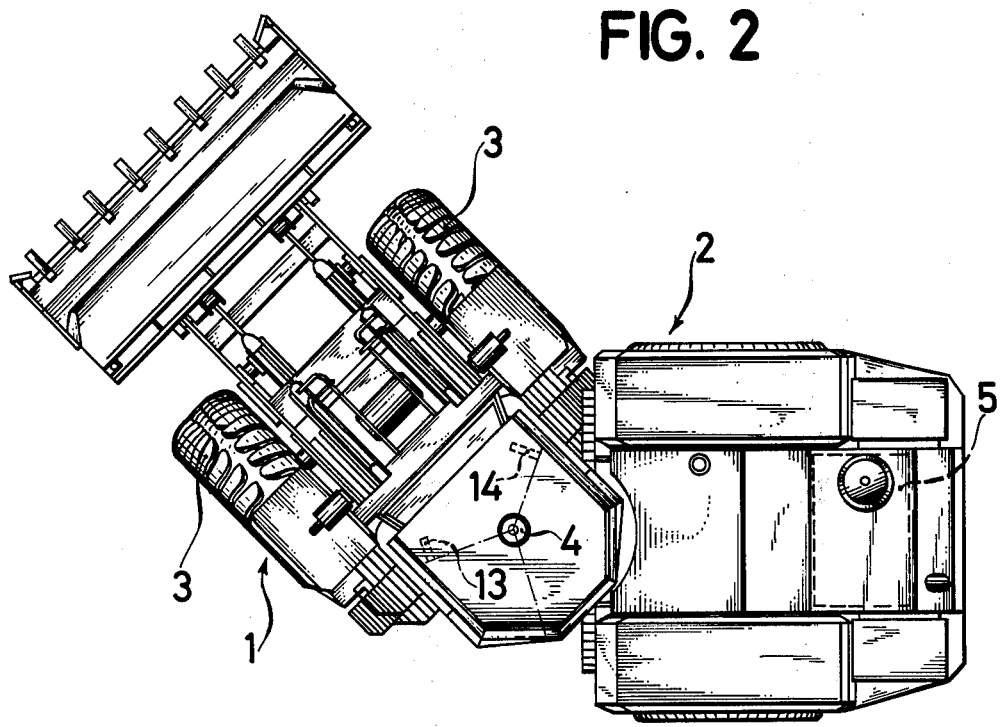
FIG. 2 is a top view of FIG. 1.

The device according to the present invention is characterized primarily in that the actuation of the magnetic valve is effected through the intervention of two relays, and that a conductor which is connected to the + pole of the battery feeding the electric circuit communicates with the conductors leading to the relay, and that from there a connecting line leads directly to the conduit interconnecting two pressure switches, said relays being arranged in self-holding circuits which are actuated by means of approximation initiators with positive exit and are again extinguished by two pressure switches.

The advantage of the arrangement according to the present invention consists in that during the steering, the steered vehicle parts no longer abut each other because prior to the contact, the hydraulic actuation will be switched off.

Referring now to the drawings in detail, a wheel loader comprises a front carriage 1 and a rear carriage 2 both of which move on pneumatic tire equipped wheels 3 and by means of the hinge joint or articulated steering gear 4 are connected to each other while being pivotable about the vertical axis. The main drive motor 5 drives the hydraulic steering pump 6 which conveys the oil under pressure which is required for steering of the wheel loader. By means of the hydraulic conduit 7, the valve 8 limiting the pressure current communicates with the hydraulic steering pump 6. An oil return conduit 9 leads from said valve 8 directly to the tank 10. Hydraulic control conduits 12a and 12b connect pressure line 7 from pump 6 through normally closed magnetic valve 11 to tank 10, so that pressure from pump 6 may be relieved by opening valve 11 under control of solenoid 24. The hydraulic steering pump 6 conveys hydraulic oil to the hydraulic steering cylinders 39a and 39b through lines 7 and 49, the manual steering unit 37 actuated by the steering wheel 36, the hydraulic conduits 35a and 35b, and the servo control valves 38a and 38b. The pressure switches 20 and 29 communicate through hydraulic conduits 43 and 44 with the hydraulic conduits 35b and 35a, respectively. The servo control valves 38a and 38b which through the hydraulic conduits 47 and 48 communicate with the hydraulic steering cylinders 39a and 39b are actuated by the hydraulic pump 6 through the intervention of the hydraulic conduit 50.

Arranged on both sides of the front carriage 1 are approximation initiators 13 and 14 which are connected to each other by electric conductors 15a and 15b and are also connected with the electric battery 31. Furthermore, the electric conduit 16 leads from the initiator 13 to the relay 54 and line 23 leads to air initiator 14 to relay 55. When the approximation initiator 13 is connected with contacts closed for actuation, the relay 54 receives a current pulse and attracts while the two contacts in the relay 54 are closed. The current flows to the coil 24 through the conductor 41, a contact of the relay 54 and the conductor 61. As a result thereof, the magnetic valve 11 will be opened. After the current pulse through the conductors 56 annd 59, the relay 54 remains self-holding until the pressure switch 20 by way of contact opening in the relay 54 breaks the current flow in the self-holding circuit. As a result thereof also the current to the magnetic coil 24 is interrupted, and the magnetic valve 11 is closed again.

When steering in clockwise direction toward the right, corresponding operations occur through the approximation initiator 14, the relay 55 and the pressure switch 29.

The operation is as follows: with the steering wheel 36 in straight forward driving position, turning the steering wheel 36 to the left (counterclockwise in FIG. 5) actuates the control mechanism 87 in the manual steering unit 37 in a known manner to shift the valve mechanism 88 through connection 89 to the right in FIG. 5, so pressure line 49 connects to line 92 through passage 91, line 92 through the valve in 87 connecting to line 35a through passage 90 in valve 88. Line 35b through passage 93 is connected to line 9 and tank 10, thereby relieving pressure in line 35b.

Figure 5:
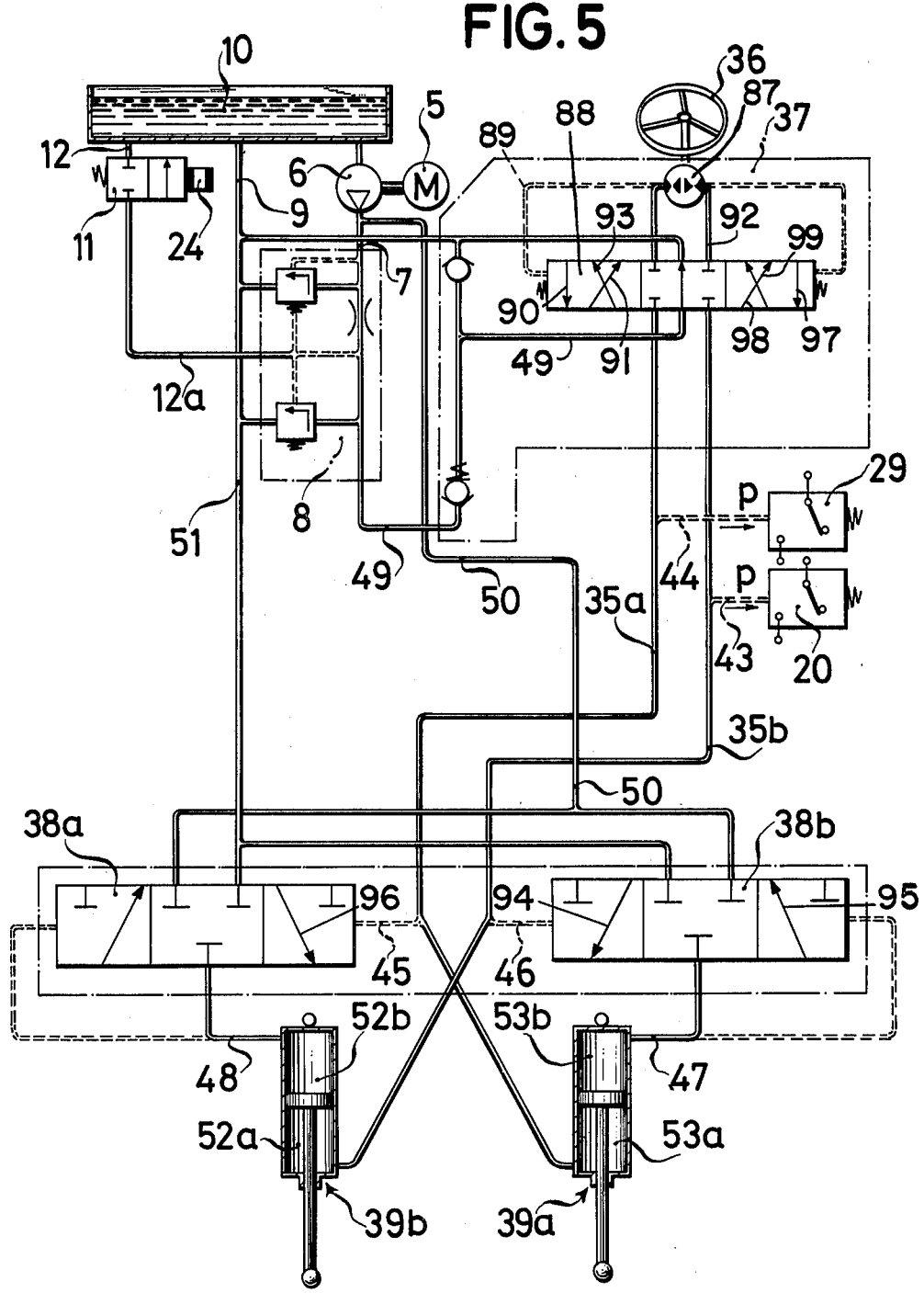
FIG. 5 is a diagrammatic illustration of the steering installation in rest position, including the hydraulic part.

Oil from pump 6 in line 35a enters chamber 53a in hydraulic cylinder 39a, and at the same time shifts valve 38a, through line 45 to the left in FIG. 5. Valve 38b moves to the left at the same time. Valve 38a connects chamber 52b of cylinder 39b to line 50 from pump 6 through line 48 and passage 96. The pressure in chambers 53a of cylinder 39a and 52b in cylinder 39b thereby draws in the piston in 39a and extends the piston in 39b, turning the front carriage 1 to the left. Pressure in chambers 53b of cylinder 39a and 52a of cylinder 39b is removed by connecting 52a to line 35b through passage 93 in valve 88 to line 9 to tank 10 and chamber 53b through line 47 and passage 95 in valve 38b (moved to the left) to lines 51 and 9 to tank 10.

When the front carriage 1 is turned far enough to the left to cause engagement with initiator 13, a circuit is closed from positive pole of battery 31 through line 16 and the solenoid of relay 54 and lines 63, 69, pulling up the relay and closing contacts in line 41 from battery 31 and line 40, and in the holding circuit 56. The pressure switch 20 in the holding circuit 56, 64, 59 is closed, since line 35b is not under pressure. Closing contacts of relay 54 in line 41, 61, 62 energize solenoid 24 of valve 11, thereby opening the valve 11 in lines 12a, 12b and removing pressure from lines 49, 35a and chambers 53a and 52b of hydraulic cylinders 39a and 39b, and preventing further movement of front carriage 1 to the left.

As soon as steering wheel 36 is turned in the opposite direction, the hydraulic control element or pump 87 will shift valve 88 to the left, producing pressure in line 35b through passage 97 to cause pressure switch 20 to open, thereby releasing relay 54 and allowing valve 11 to close. Pump 6 will now operate the steering mechanism to the right in a manner similar to above described movement to the left, exerting pressure in line 49 and, through passage 98, to line 35b to shift valve 38b to the right through line 46 and produce pressure in chamber 52a of cylinder 39b. Line 50 will be connected to chamber 53b of cylinder 39a through passage 94 of valve 38b. The piston cylinders 39a, 38b now operate the steering mechanism to the right, pressure in the chamber 53a being relieved through line 35a and passage 99 to line 9, and in chamber 52b through lines 48 and 51.

Turning the steering wheel in the opposite direction will engage the initiator 14 upon further turning the front carriage to the right, energizing the solenoid in relay 55 through lines 58 and 59, to close contacts in line 42 from battery 31 and line 40 to line 61 and solenoid 24 of switch 11. The holding circuit 57, 65, 60 through pressure switch 29 holds the relay with contacts closed until pressure switch 29 is opened upon turning the steering wheel in the opposite direction, thereby shifting valve 88 to the right and breaking the holding circuit. Pressure switch 29 will be opened by pressure in line 35a, when wheel 36 is turned in the opposite direction, and pressure from pump 6 will operate the steering mechanism to the left.

Figure 3:
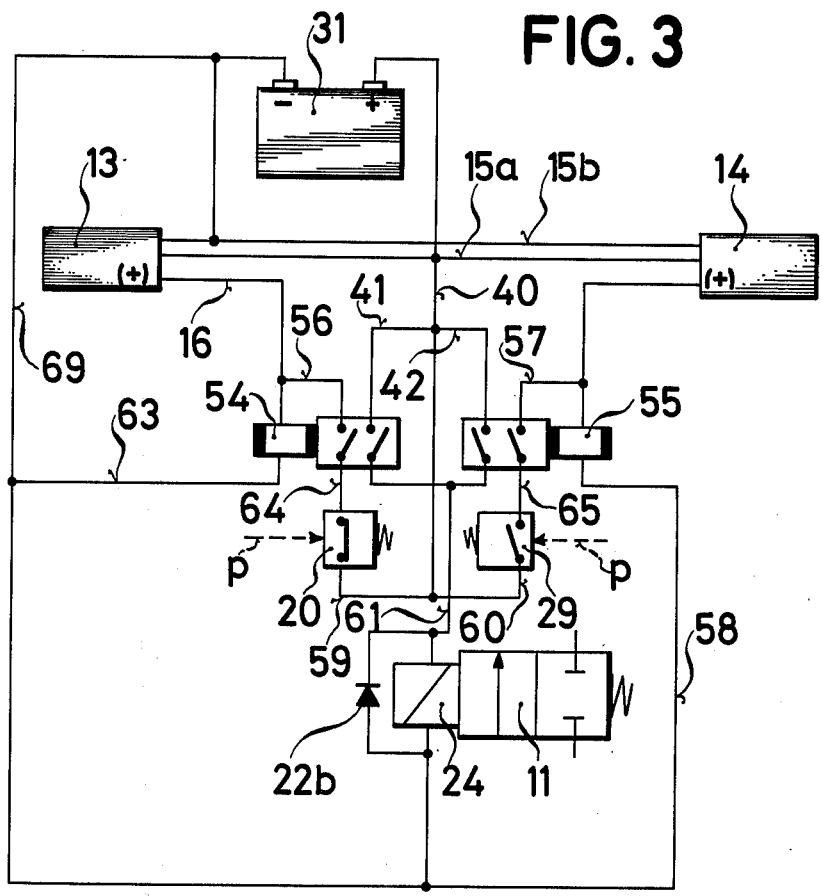
FIGS. 3 and 4 are electric control circuits for the device according to the invention.
Figure 4:
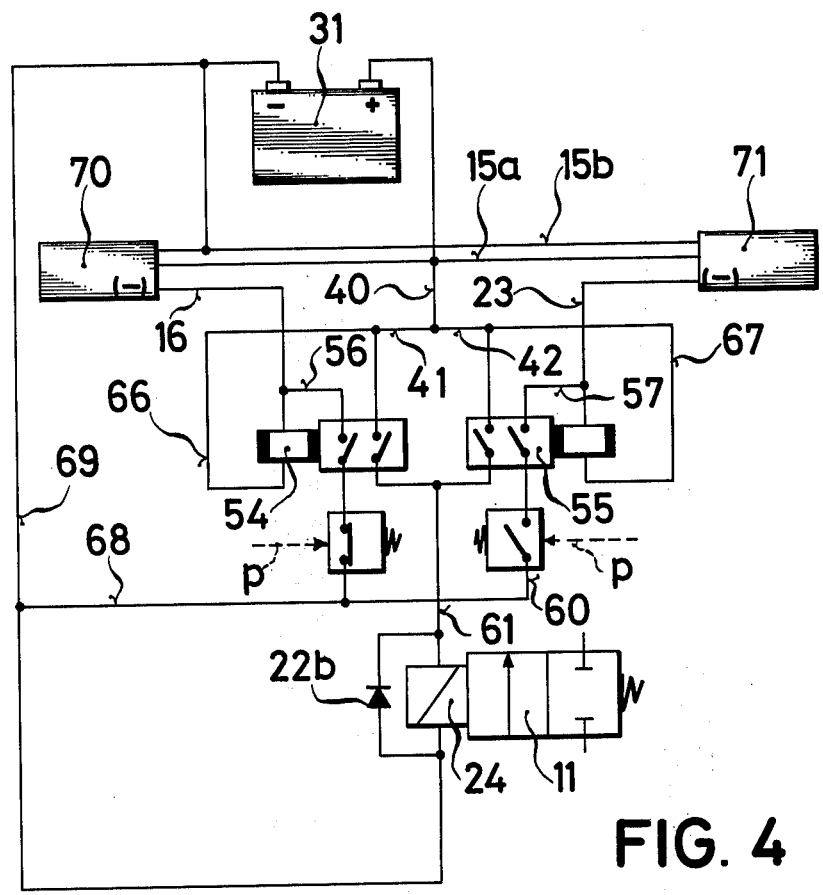

The circuit in FIG. 4 is similar to that in FIG. 3, except that the initiators 30 and 71 for left and right limits of turning movement are on the negative side of the battery. Thus initiator 71 closes a circuit from the negative pole to line 23 and solenoid of relay 55. Contacts of relay 55 in lines 40, 42 and 61 close the circuit through solenoid 24 of valve 11, and the holding contacts are closed in line 57 pressure switch p and line 60 to 68, 69 and negative pole of battery 31.

The pressure switches 20 and 29 are in the specific embodiment shown in FIG. 3 so adjusted that they are open when the steering is not actuated by the residual pressure (approximately 3 bar) prevailing in the hydraulic conduits 35a and 35b, and only close again at pressures below approximately 3 bar for instance pressure switch 20 during the left steering turn. In this way, it will be avoided that the relays 54 and 55 will be actuated by possible interfering pulses, for instance when turning on the ignition of the implement.

It is, of course, to be understood that the present invention is, by no means, limited to the specific showing in the drawings, but also comprises any modifications within the scope of the appended claims. Thus also approximation initiators with negative exit or limit switches may be employed as shown for instance in the embodiment of FIG. 4. Instead of the pressure switches 20 and 29 with control point adjustment of approximately 3 bar, also other switch points may be employed for instance 130 bar, in which instance the pressure switch 20 is actuated by the pressure in the conduit 35b. Furthermore, the application is not limited to steering arrangements.

What is claimed is:

1. A control device for contact-free limitation of the relative movement between a pair of members which approach one another in respective opposite directions of relative movement, especially movement of hydraulically actuated mechanical parts of a steering device for bucket loaders; fluid motor means connected to said members to effect relative movement in opposite directions between said members, a source of pressure fluid, control valve means for reversibly connecting said source to said motor means, the improvement in combination therewith comprising a proximity switch actuated in each of the opposite relative positions of said members in which relative movement therebetween in a respective direction is to be interrupted, only one pressure control magnetic valve connected to said source and an exhaust, said valve being spring urged toward closed position and having a solenoid energizable for movement of said valve into open position, a relay energizable by each proximity switch and each thereof operable when energized to energize said solenoid, a holding circuit for each relay including a normally closed switch, each normally closed switch being operable into open position by fluid pressure, and means operable following the energization of one of said relays for removing fluid pressure from said motor means to cease relative movement between said pair of members in response to the adjustment of said one pressure control magnetic valve to open said valve to connect said source to an exhaust.

2. A control device as claimed in claim 1, including a normally closed switch in said holding circuit which is opened by fluid pressure to release said relay and deenergize the solenoid of said magnetic valve, said switch being operable to open by fluid pressure under control of movement of said members in a direction away from said proximity switch.

3. A control device in combination according to claim 2 in which the proximity switches have the sides connected to said relays negative.

* * * * *